United States Patent
Esteban et al.

(10) Patent No.: US 9,807,302 B1
(45) Date of Patent: *Oct. 31, 2017

(54) OFFSET ROLLING SHUTTER CAMERA MODEL, AND APPLICATIONS THEREOF

(71) Applicant: Google Inc., Mountain View, CA (US)

(72) Inventors: Carlos Hernandez Esteban, Kirkland, WA (US); Robert Anderson, Seattle, WA (US)

(73) Assignee: Google Inc., Mountain View, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 14/570,472

(22) Filed: Dec. 15, 2014

Related U.S. Application Data

(63) Continuation of application No. 13/407,361, filed on Feb. 28, 2012, now Pat. No. 8,937,643.

(51) Int. Cl.
*H04N 13/02* (2006.01)
*H04N 5/232* (2006.01)
*H04N 13/00* (2006.01)

(52) U.S. Cl.
CPC ..... *H04N 5/23238* (2013.01); *H04N 13/0007* (2013.01)

(58) Field of Classification Search
CPC .................. H04N 5/23238; H04N 13/0007
See application file for complete search history.

(56) References Cited

U.S. PATENT DOCUMENTS

| | | | |
|---|---|---|---|
| 2007/0030342 A1* | 2/2007 | Wilburn | H04N 5/247 348/47 |
| 2007/0183631 A1 | 8/2007 | Zhang et al. | |
| 2008/0144964 A1 | 6/2008 | Soinio et al. | |
| 2009/0201361 A1* | 8/2009 | Lyon | H04N 5/23203 348/36 |
| 2010/0309340 A1 | 12/2010 | Border et al. | |
| 2011/0176043 A1 | 7/2011 | Baker et al. | |
| 2011/0267514 A1 | 11/2011 | D'Angelo et al. | |

* cited by examiner

*Primary Examiner* — Zhubing Ren
(74) *Attorney, Agent, or Firm* — Lerner, David, Littenberg, Krumholz & Mentlik, LLP

(57) ABSTRACT

Embodiments efficiently account for variations in camera position across an image, when the image is texture mapped from a single position associated with the image. In an embodiment, each pixel of an image is texture mapped to a three dimensional model. A time offset mask for the image and a value representing a speed of the camera are received. The time offset mask and speed values are used to create an offset mask. The offset mask is applied to the texture mapped model to correct for variations in camera position across an image.

17 Claims, 7 Drawing Sheets

OFFSET ROLLING SHUTTER CAMERA MODEL, AND APPLICATIONS THEREOF

CROSS-REFERENCE TO RELATED APPLICATIONS

The present application is a continuation of U.S. patent application Ser. No. 13/407,361, filed Feb. 28, 2012, the disclosure of which is incorporated herein by reference.

BACKGROUND

Field

This application relates to projecting image data onto a three-dimensional model.

Related Art

Imaging systems exist that include more than one camera in a rosette formation attached to a vehicle. Those imaging systems may be used to capture panoramic images, for example, along a street. Each camera in the rosette formation includes an image sensor that converts an optical signal into an electrical signal to form an image. Two types of image sensors avoid the need for a mechanical shutter-an interline-shutter charge-coupled device (CCD) or a complementary metal oxide semiconductor (CMOS) sensor. The CMOS sensor typically has a rolling shutter, which exposes different lines of the scene at slightly different times, in a sequence that rolls across the image. As a result, different pixels of the scene within each image sensor may be captured at a somewhat different time.

To deal with warping and ghosting issues caused by the variations in exposure time, the various cameras may be coordinated as described in U.S. Patent Publication No. 2009/0201361. However, even with these methods, different pixels of the resulting panoramic image may have different associated camera parameters. For example, because each pixel was taken from a slightly different position, each pixel may have a slightly different perspective. These errors become apparent when the image is texture mapped onto a three dimensional model. Because of the variation in camera position across an image, when the image is texture mapped from a single position associated with the image, the resulting texture map may not properly correspond to the three-dimensional model.

One approach is to project each pixel individually using camera parameters associated with that pixel. However, repeatedly projecting individual pixels may consume a large amount of computing resources, such as processing time and memory.

BRIEF SUMMARY

Embodiments efficiently account for variations in camera position across an image, when the image is texture mapped from a single position associated with the image. In a method embodiment, a first speed value corresponding to a speed of a camera when a first image was captured is received. The camera was in motion when the first image was captured. A plurality of time offset values are also received. Each time offset value corresponds to a pixel in the images captured by the first camera including the first image and represents a relative time when the camera captured the pixel. The camera captures different portions of the first image at different times. For respective pixels of the first image, a position in three-dimensional space at an intersection between a ray and a three-dimensional model representing content of the first image is determined. The ray is extended from a geocode of the first image based on a location of the pixel and camera parameters representing an orientation and focal length of the camera when it took the first image. An offset vector for the pixel is also determined. The offset vector corresponds to the first speed value and the time offset value corresponding to the pixel. Finally, the determined position is altered as specified by the offset vector. In this way, the altering corrects for a variation between the geocode of the first image and a position of the camera when the camera captured the pixel.

System and computer program product embodiments are also disclosed.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments efficiently account for variations in camera position across an image when the image is texture mapped from a single position associated with the image. To account for these variations, the position of projected pixels are offset by a distance determined according to a speed of the vehicle and a time offset of the pixel's exposure.

Some embodiments account for errors associated with use of a single geocode for a panorama that was captured from multiple positions over time. In an example operation, a client may receive, from a server, a mask corresponding to each panoramic image. Each mask may have a value corresponding to each pixel of the corresponding panoramic image. The value at each pixel may represent a time offset value indicating when that pixel was captured by the panoramic camera relative to other pixels in the image. In addition to the masks, the client may receive, from the server, a velocity value representing a speed that the panoramic camera was moving at the time it took each panoramic image. Using the velocity and time offset values, the client may determine a distance by which to offset projected pixels from the panoramic images. To make this determination, client may utilize a vertex shader and the client's graphics processing unit (perhaps through use of HTML 5). In this way, the client can account for errors associated with using a single geocode for a panorama that was captured from multiple positions.

The errors resulting from use of the single geocode for each panorama may become apparent when a client transitions between two panoramic images. To transition between two panoramas, a first image generated from the first panorama may be blended with a second image generated from the second panorama. Because of the errors associated with the panoramas' geocodes, the generated first and second images may display objects at different positions. Having objects appear at different positions in the first and second images may cause ghosting in the blended image. As result of the ghosting, the transition between the two panoramic images may be visually displeasing or even disorienting. By correcting the projection errors, embodiments may improve the transition between two panoramic images on a client.

In the detailed description of embodiments that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
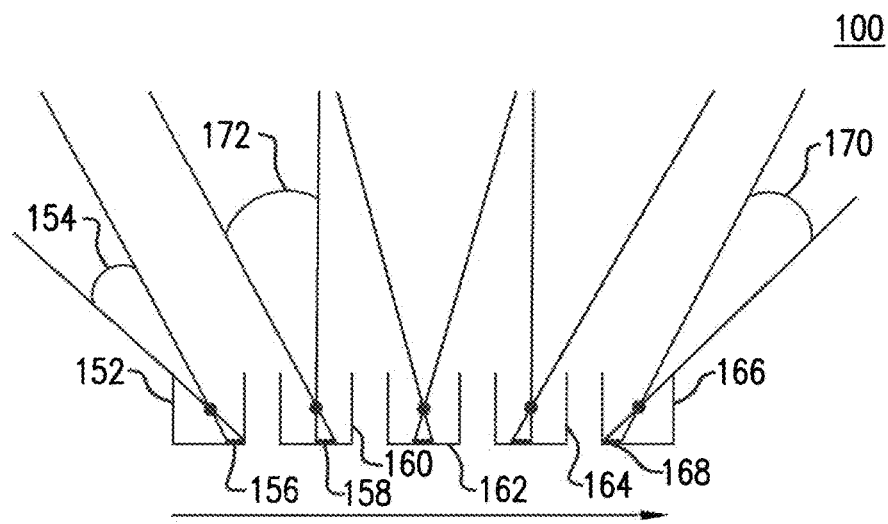
FIG. 1 is a diagram illustrating a camera having a rolling-shutter CMOS sensor with groups of photodiodes arranged in columns substantially perpendicular to the ground.
Figure 2A:
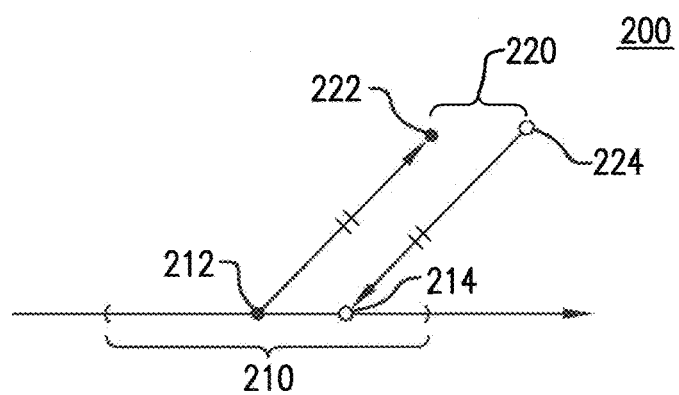
FIG. 2A is a diagram illustrating projection error arising from texture mapping a pixel of an image with variations in camera perspective across different portions of the image.
Figure 2B:
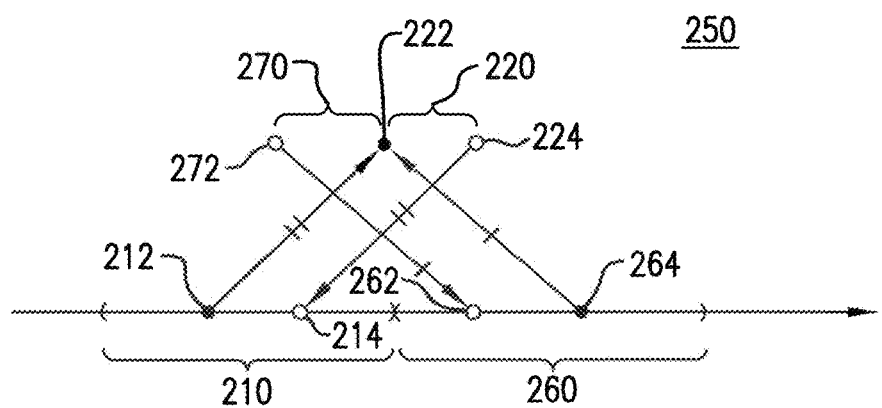
FIG. 2B is a diagram illustrating how the projection error in FIG. 2A can be exaggerated when blending two images taken from different positions.

This detailed description section begins by describing projection errors caused by timing variations of a camera in motion with respect to FIGS. 1 and 2A-B. How the projection errors are corrected is described with respect to FIGS. 3-6. An embodiment where the projection errors are corrected to transition between two images are described with respect to FIGS. 7 and 8A-B. Finally, a system implemented according to an embodiment is described with respect to FIG. 9.

Projection Errors

FIG. 1 shows a diagram 100 illustrating a camera having a rolling-shutter CMOS sensor with groups of photodiodes arranged in columns substantially perpendicular to the ground.

Diagram 100 shows a camera at different positions at different points in time. As mentioned earlier, the camera may be affixed to a vehicle, and the vehicle may be in motion. In an embodiment of the invention, the columns of photodiodes are exposed back-to-front in object space and front-to-back in image space.

At a position 152, the camera exposes a forward-most photodiode column 156 to capture an image including a back-most field of view 154. Then, at a position 160, the camera exposes a photodiode column 158, which is behind photodiode column 156. This exposure captures a field of view 172, which is to the front of field of view 154. As the camera moves to a position 162 and a position 164, columns continue to expose in a front-to-back manner, which captures objects from back-to-front. Finally, when the camera is at a position 166, the camera exposes a back-most photodiode column 168 to capture an image including a forward-most field of view 170.

Positioning the image sensor in portrait orientation avoids the warping of vertical features that occurs in landscape orientation. Instead, objects may appear stretched by an amount that depends on their distance. Stretching is not as visually unappealing as warping. In fact, stretching may be a positive feature. Stretching makes foreground objects thinner with respect to background objects, rather than fatter, when the rolling shutter is arranged in the direction described. As result, the foreground objects occlude less of the scene behind them. This may be a benefit in many applications related to panoramic imaging.

However, because different portions of the image were captured from different locations, the different portions may effectively have a different focal point. Yet, the entire image may only have a single associated position value.

In addition to the stitched panoramic image, there may also be an equivalent 'stitched' depth map that is needed to project the image into three-dimensional space during the rendering phase. The stitched depth map is computed from a three-dimensional point cloud captured with a laser. Each pixel in the stitched panoramic image may correspond to a pixel in the depth map. The process of stitching depth values is the one that introduces the geometric error since the depth values are simply pasted using the same mask as for the color pixels, so they are not geometrically correct. Using a single position value to estimate the focal point of an image that in fact has a varying focal point can produce errors, as illustrated in FIGS. 2A and B.

FIG. 2A is a diagram 200 illustrating projection error arising from texture mapping a pixel of an image with variations in camera perspective across different portions of the image. Diagram 200 illustrates an image that exposes at multiple positions 210 over time. However, the resulting image may only have a single position 212 estimating the multiple positions 210. The discrepancy between the multiple positions 210 and the single position 212 may cause reprojection errors.

In the example illustrated in diagram 200, an object at position 224 may be captured from a focal position 214, but the image may only be stored with a single geocode at position 212. That image may be texture mapped onto a three-dimensional model. To texture-map the image, the geocode at position 212 is used as the focal point for the projection. In the embodiment where the model is a stitched depth map, the depth map would be used to determine a depth value for each pixel, and the depth may be used to raycast a point from the position 212. As a result, the pixels representing the object may be projected onto the three-dimensional model at position 222, not position 224. This discrepancy is illustrated in diagram 200 by a reprojection error 220.

The reprojection errors caused by estimating the image's multiple focal points with a single point become more apparent when two images are blended. As mentioned above, panoramic images may be captured by a vehicle at discrete locations along a street. When presented to the user, the user may want to navigate from a first panoramic image to a second, nearby panoramic image. In navigating between panoramic images, an animation may be displayed to provide the user with a sense of movement between the two images. The animation may involve texture mapping the two images onto the same three-dimensional model. For each frame of the animation, the texture mapped models may be rendered from a position between the first and second panoramic images. The two rendered images may then be blended. In this way, an animation may be determined to transition between panoramic images. However, in blending the two images, reprojection errors caused by estimating multiple focal points of an image with a single focal point may become exaggerated. This exaggeration is illustrated in FIG. 2B.

FIG. 2B shows a diagram 250 illustrating how the projection error in FIG. 2A can be exaggerated when blending two images taken from different positions. Diagram 250 illustrates the capture and re-projection of two images. The first image was discussed above with respect to FIG. 2A and was captured from the multiple focal positions 210. The second image, on the other hand, was captured from multiple focal positions 260.

For the first image, as discussed with respect to FIG. 2A, an object at position 224 is captured from a position 214. However, the image's geocode is not at position 214, but at a different position 212. When that object is projected onto a three-dimensional model to create a texture mapped three-dimensional model, it is projected to a position 222, resulting in projection error 220.

While the first object from the first image is projected to a position 222, a second, different object may be projected onto the three-dimensional model from the second image. The second image has an estimated focal point at position 264. However, the second object was actually located at a position 272 and captured at a position 262. When the second object is texture mapped using the estimated focal point 264, it appears at a position 222 on the three-dimensional model.

In an illustrative example, a tree may be located at position 272 and a building may be located at position 224. Due to the reprojection errors, the tree and the building may be texture mapped to the same position on the three-dimensional model. When the two texture-mapped models are rendered from a common viewpoint, the building and the tree would appear at the same place on the two rendered images. When the two rendered images are blended, the tree or the building may appear ghosted. This result can be visually unappealing.

Figure 4:
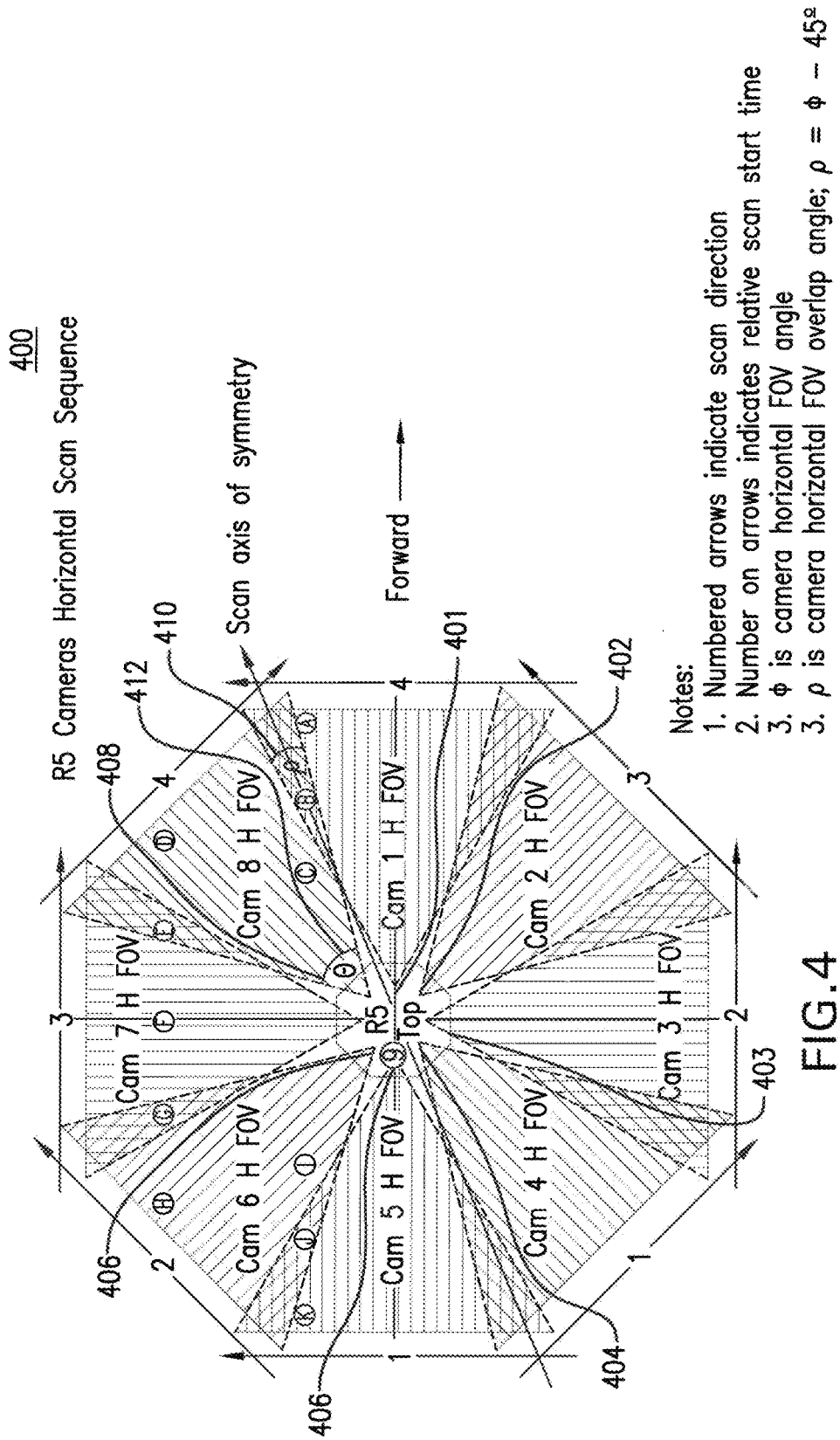
FIG. 4 is a diagram showing the operation of a camera rosette for capturing panoramic images.
Figure 5:
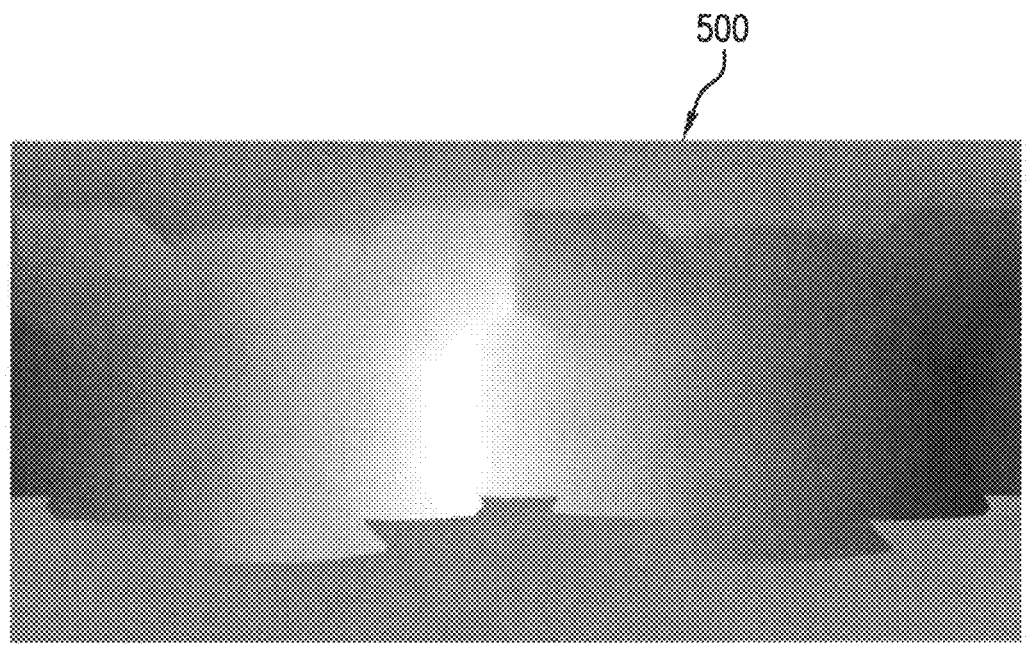
FIG. 5 is a mask image specifying time offset values for pixels of the panoramic images.
Figure 6:
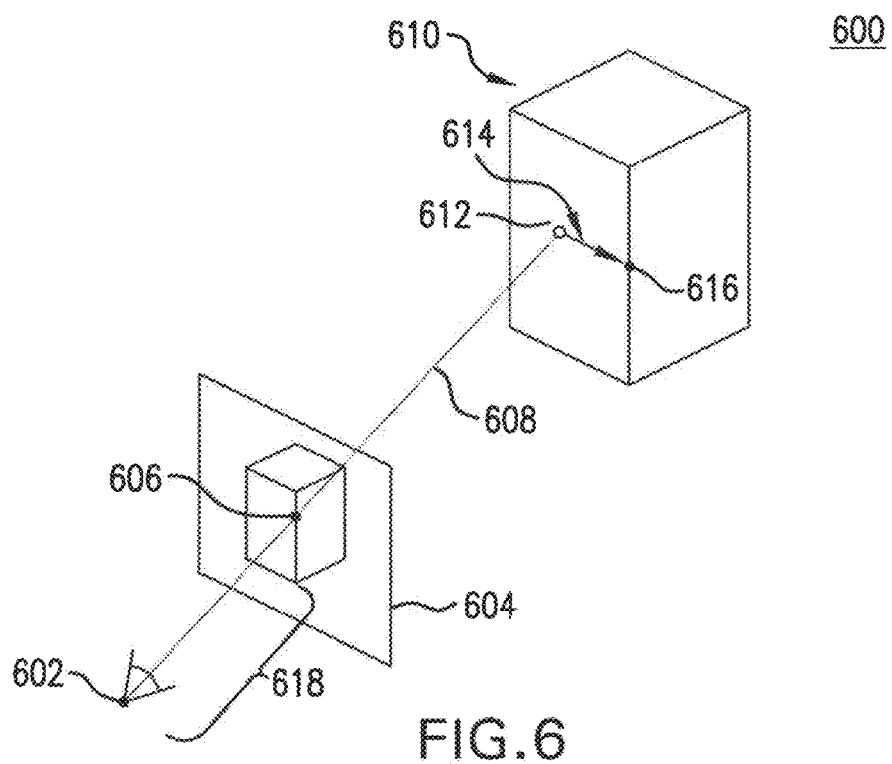
FIG. 6 is a diagram illustrating a projecting a pixel onto a three-dimensional and moving the projection according to a time offset value, according to an embodiment.
Figure 7:
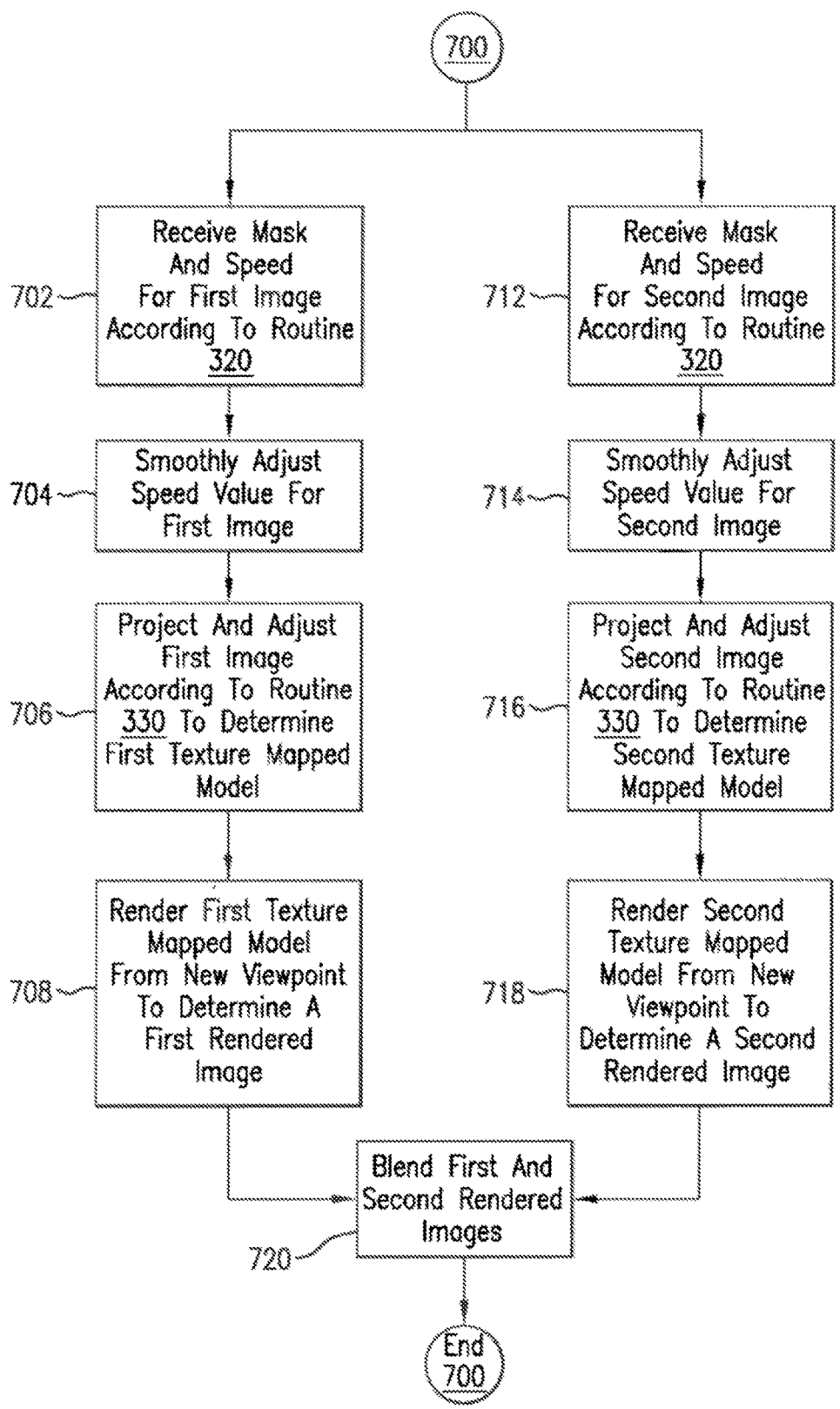
FIG. 7 is a flowchart illustrating a method to transition between two panoramic images taken with a rolling shutter camera from different perspectives, according to an embodiment.

Embodiments relate to correcting the projection errors illustrated in FIGS. 2A and B. A method for correcting the projection errors illustrated in FIG. 2A is described with respect to FIG. 3. FIGS. 4-6 provide additional illustrative diagrams that further serve to explain the method in FIG. 3. FIG. 7 illustrates blending the first and second images to correct the projection errors illustrated in FIG. 2B. Finally, FIG. 8 illustrates a system operating according to the methods in FIGS. 3 and 7.

Correcting Projection Errors

Figure 3:
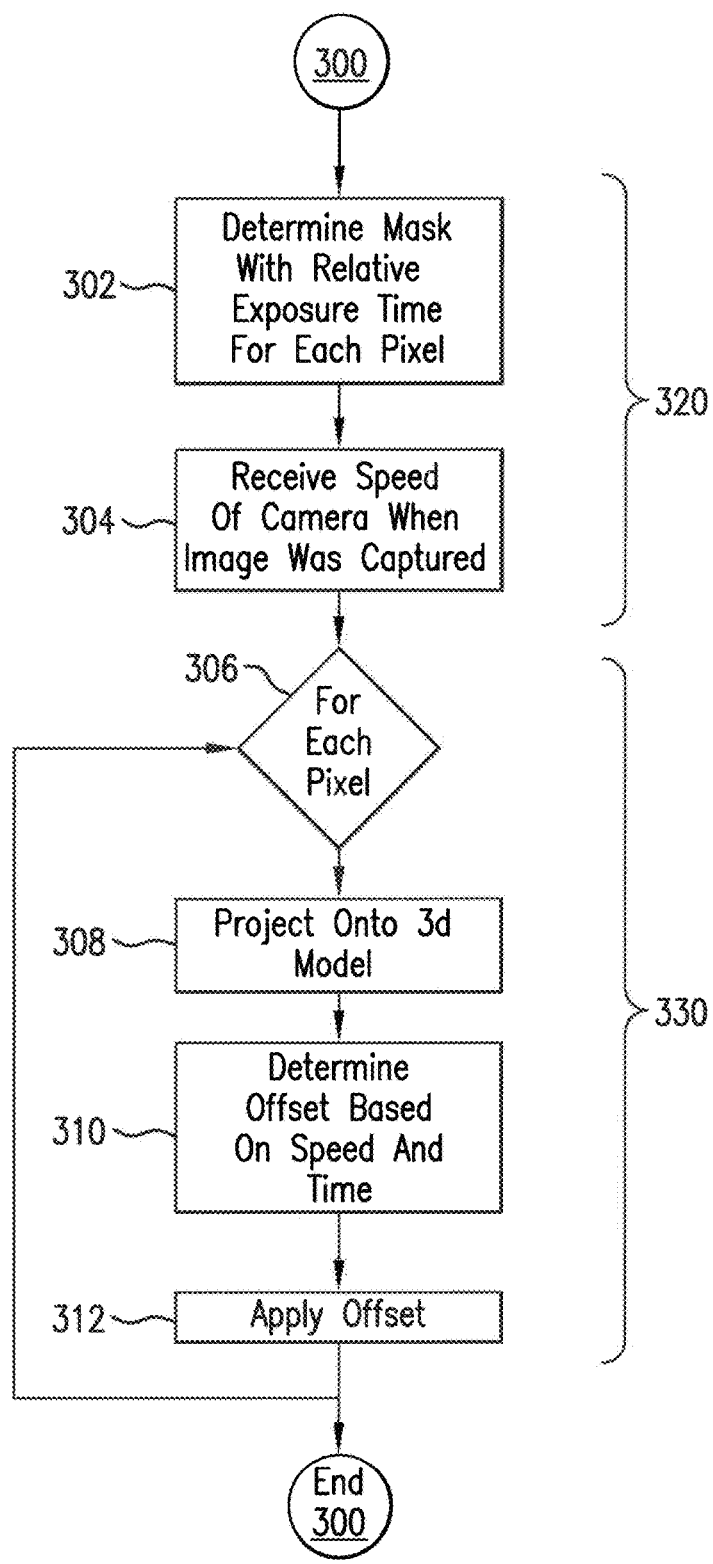
FIG. 3 is a flowchart illustrating a method to texture map a panoramic image taken with a rolling shutter camera to a three-dimensional model, according to an embodiment.

FIG. 3 is a flowchart illustrating a method 300 to texture map a panoramic image taken with a rolling shutter camera to a three-dimensional model, according to an embodiment. For clarity, method 300 is divided into two routines-a routine 320 and a routine 340.

Method 300 begins with a step 302 in routine 340. At step 302, an image mask is determined. The image mask may describe the relative exposure times of different portions of a panoramic image. In an embodiment, the image mask may have a time offset value corresponding to each pixel in a panoramic image. Each time offset value may represent a relative time when the camera captured the pixel such that the camera captures different portions of the first image at different times. For example, if a pixel was captured 75 ms after the start of the exposure, the time offset value may be 100 ms. In another example, the values may be relative, not to the start of the exposure, but to a different time, perhaps a midpoint of camera exposure. In that example, if the camera had a 100 ms exposure time, the time offset values may be relative to the midpoint-50 ms. A pixel captured 70 ms into the exposure would have a time offset value of 20 ms, and a pixel captured 30 ms into the exposure would have a time offset value of −20 ms.

The mask determined in step 302 may be specific to a particular camera configuration. An example camera configuration is illustrated in FIG. 4 and an example image mask is illustrated in FIG. 5.

FIG. 4 is a diagram 400 showing the operation of a camera rosette for capturing panoramic images. In an embodiment, a camera rosette may include nine cameras-eight in a horizontal ring, and one directed straight up. Diagram 400 shows the eight horizontal cameras. Each camera in the camera rosette includes a rolling shutter sensor in portrait orientation with columns of photodiodes.

The camera rosette begins capturing a panoramic image at the rear-most cameras 405 and 404. Both of the cameras 405 and 404 start by exposing the back most photodiodes columns (in object-space) and scan forward as described with respect to FIG. 1A. Cameras 406 and 403 start may start capturing images at a time defined by a time delay.

The rosette continues to scan forward until the forward-most cameras 401, 408 have completed scanning. Each camera starts at a time defined by the start of the adjacent camera to its rear plus a delay. For example, a camera 402 starts at a time defined by the start of camera 403 plus a delay.

Thus, in the rosette camera configuration illustrated in FIG. 4, different pixels are captured at different times. In one example, a camera rosette may have a total exposure time over 0.25 seconds. That means that a car travelling in a straight line at 30 mph travels over 3 meters during an exposure. The variations are introduced both due to the fact that each individual image sensor may have a long, rolling shutter exposure and due to the number of cameras that need to be exposed in sequence.

As mentioned above, the relative exposure times for each pixel may be described by the time offset values in an image mask, such as the mask illustrated in FIG. 5. FIG. 5 is a mask image specifying time offset values for pixels of the panoramic images taken by a camera rosette, such as the rosette illustrated in FIG. 4. The mask image may be a greyscale image, where each pixel is represented by an 8 bit value.

Referring back to FIG. 3, in addition to determining the image mask at step 302, routine 320 also includes a step 304. At step 304, a speed value is received. The speed value may correspond to a speed of a camera when the image was captured. As mentioned above, the panoramic images may be captured by vehicles in motion. When the panoramic image is captured, the speed of the vehicle may also be captured. If the speed of the vehicle varies over the course of an image exposure, an average or approximate speed may be used.

Once the camera's mask and the image's speed are determined and received at steps 302 and 304, that information may be used to correctly texture map the image to the three-dimensional model in a routine 330. Routine 330 is also described with respect to a diagram in FIG. 6. FIG. 6 shows a diagram 600 illustrating a projecting a pixel onto a three-dimensional and moving the projection according to a time offset value, according to an embodiment.

Routine 330 includes steps 308-312 that are repeated for each pixel in the image, as illustrated by a decision block 306. At step 308, the image is projected onto the three-dimensional model using camera parameters associated with the image.

Referring to FIG. 6, the estimated geocode of the image is at a position 602. From that position 602, a ray 608 is extended through a pixel 606 according to a focal length 618 of the image. Ray 608 intersects with a three-dimensional model at point 612. In this way, a pixel 606 may be projected onto a three-dimensional model 610 from the geocode of the image. In the embodiment where the three-dimensional model is represented using a stitched depth map, the depth map may be used to look up a depth value corresponding to pixel 606. Then, the ray 608 would be constructed. Then, point value 612 would be determined as the point along ray 608 at the determined depth value. In this way, point 612 may be determined. But, as described above with respect to FIG. 2A, the projection may be inaccurate.

Referring back to FIG. 3, the inaccuracy may be corrected in steps 310 and 312. In step 310, an offset vector for the pixel may be determined. The offset vector corresponds to the first speed value and the time offset value corresponding to the pixel. For example, the mask determined in step 302 may include a time offset for the pixel. By multiplying the time offset from step 302 with the speed received in step 304, a magnitude for the offset vector may be determined. A direction of the offset vector may be a direction of the vehicle when the vehicle took the panoramic images. At step 312, the offset vector is applied to the point determined in step 308 to correct projection errors.

In FIG. 6, the offset vector 614 is applied to point 612 to determine a point 616. In this way, by altering the projected position as specified by the offset vector, an error introduced by a variation between the geocode of the image and a position of the camera when the camera captured the pixel is corrected.

Blending Nearby Images

As mentioned above with respect to FIG. 2B, the error introduced by a variation between the geocode of the image and an actual focal point of the camera when each pixel was captured may be become more apparent when transitioning between images. FIG. 7 is a flowchart illustrating a method 700 to transition between two panoramic images taken with a rolling shutter camera from different perspectives, according to an embodiment. In an embodiment, method 700 may be used to create an animation transitioning between the two panoramic images. In that embodiment, method 700 may be repeated for each frame of the animation.

Method 700 includes steps that occur for both panoramic images. In particular, steps 702-708 are performed for a first panoramic image, and steps 712-718 entail similar operations performed for a second panoramic image. For simplicity, steps repeated for both panoramic images are described together.

At steps 702 and 712, a mask and a speed value are received for each of the panoramic images, as described above with respect to routine 320 in FIG. 3. Because each of the images may be taken by the same camera, the mask may be the same for both the images.

At steps 704 and 714, the speed values received at steps 702 and 712 may be smoothly adjusted. As mentioned above, method 700 may be used for creating an animation to transition between two panoramic images. Before and after navigating between panoramic images, the user may be viewing a panoramic image rendered without offsets, for example as a flat image or rendered onto a sphere or cylinder. If the offsets are applied suddenly starting the animation or removed suddenly when the animation completes, the result may be appear jerky and visually unappealing. As a result, the speed values may be smoothly adjusted to phase in and out the offsets. The speed may be adjusted as illustrated in FIG. 8A.

Figure 8A:
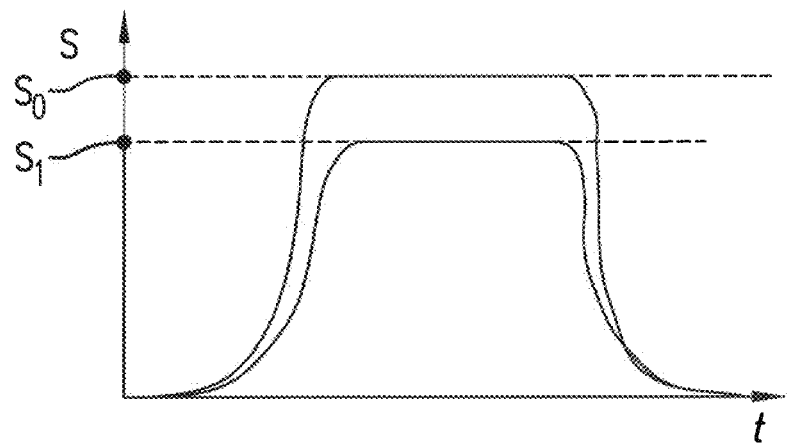
FIG. 8A is a chart illustrating smooth alternation of a speed value for determining projection offsets, which may be used in the method of FIG. 7.

FIG. 8A shows a chart 800 illustrating smooth alternation of a speed value for determining projection offsets, which may be used in method 700 of FIG. 7. On the y-axis, chart 800 shows the adjusted speed value S, and, on the x-axis, chart 800 shows a time t within the animation. The speed values representing the speed of the vehicle when the first and second panoramic images were taken are illustrated in chart 800 as S0 and S1 respectively.

As illustrated in chart 800, at the start of the animation, the adjusted speed values may be zero, or close to zero. As the animation progresses, the speed values are smoothly increased to the actual speed values S0 and S1. Finally, toward the end of the animation, the adjusted speed values decrease smoothly to reach zero, or close to zero, at the end of the animation. In this way, offsets may be gradually introduced and removed to avoid a jerky transition from between the animation and the panoramic image.

Returning to FIG. 7, once the adjusted speed values are determined in steps 704 and 714, they are used along with the image masks to project and adjust the first and second panoramic image to a three-dimensional model at steps 706 and 716. The projecting and adjusting may be performed according to routine 330 to determine corresponding first and second texture mapped models.

Once the texture mapped models are determined in steps 706 and 716, they models are each rendered from a viewpoint to determine first and second rendered images at steps 708 and 718. As mentioned above, method 700 may be used to determine an animation between two panoramic images, and each panoramic image is associated with a geographic location. In transitioning between the two panoramic images, the position (and perhaps orientation) of the viewpoint may move between the two panoramic images. But, in rendering each frame, the viewpoint may be the same to determine both the first rendered image from the first texture mapped model and the second rendered image from the second texture mapped model. In this way, at steps 708 and 718, image data from both the first and second images are rendered from the same perspective to determine the first and second rendered images.

At step 720, the first and second images are blended to determine a blended image. Each pixel of the blended image may, for example, be a weighted average of the corresponding pixels in the first and second images. At the start of the animation, the weight for the first rendered image may be relatively strong, and the weight for the second rendered image may be relatively weak. As the animation progresses, the weight for the first rendered image may weaken and the weight for the second rendered image may strengthen.

Figure 8B:
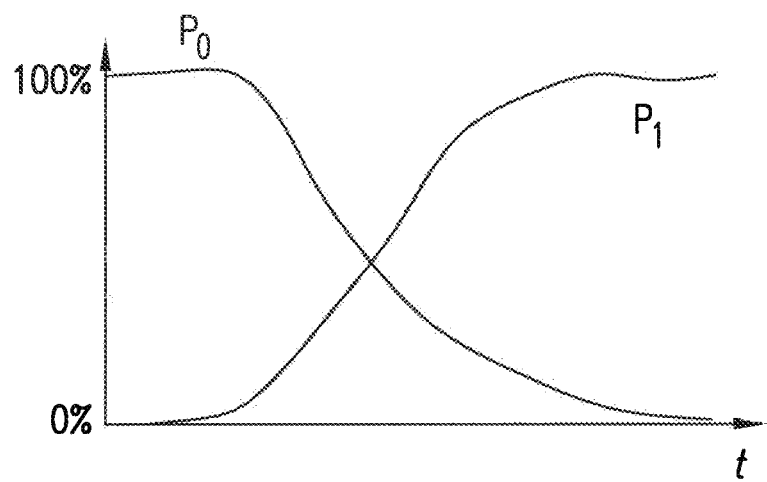
FIG. 8B is a chart illustrating alternation of the relative weight for blending two panoramic images, which may be used in the method of FIG. 7.

Toward the end of the animation, the weight for the first rendered image may be relatively weak, and the weight for the second rendered image may be relatively strong. How the weights can change over the course of the animation is illustrated in FIG. 8B. In FIG. 8B, the weight of the first rendered image is labeled as P0 and the weight of the second rendered image is labeled as P1.

In this way, using method 700 to blend images, an animation to transition between two panoramic images may be created.

System

Figure 9:
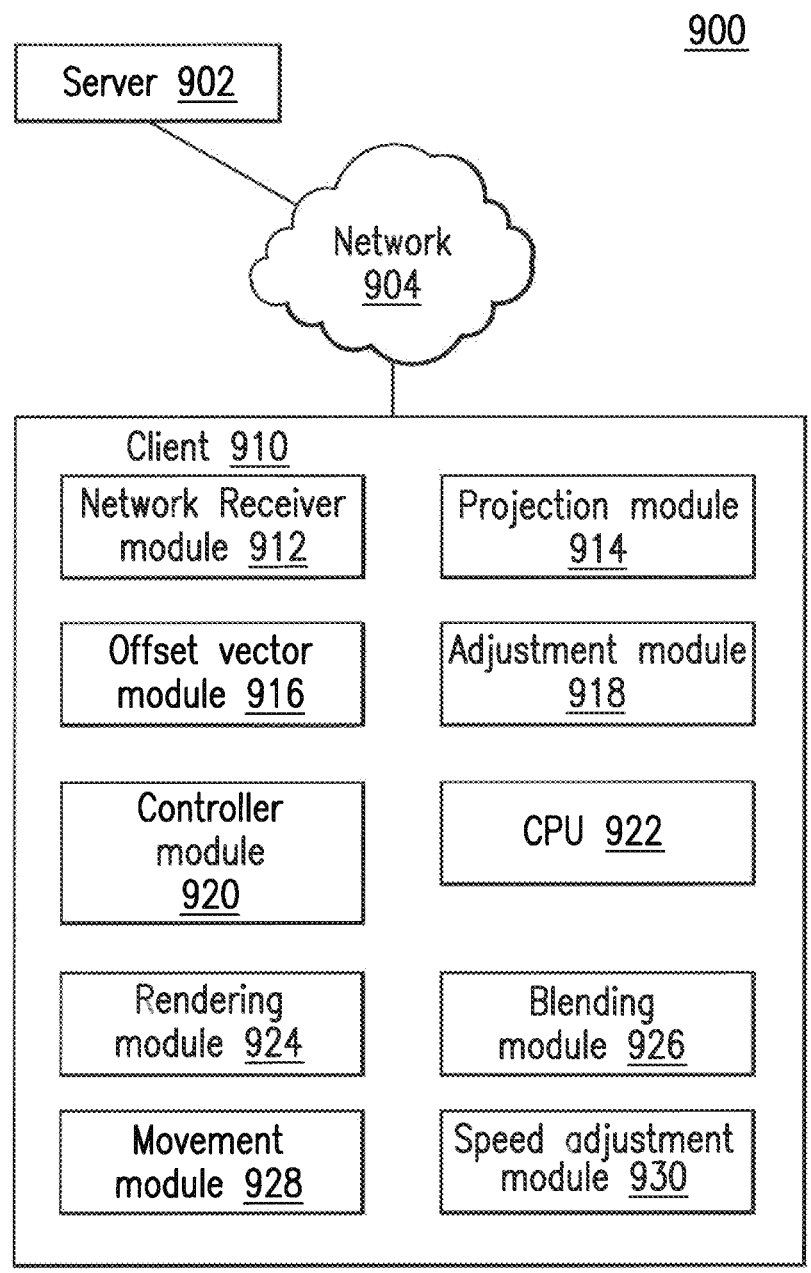
FIG. 9 is a diagram illustrating a system to texture map a panoramic image taken with a rolling shutter camera to a three-dimensional model, according to an embodiment.

FIG. 9 is a diagram illustrating a system 900 to texture map a panoramic image taken with a rolling shutter camera to a three-dimensional model, according to an embodiment. System 900 may, for example, operate according to the methods in FIGS. 3 and 7.

System 900 includes a server 902 and a client 910 coupled to each other via a network 904. Client 910 includes a graphics processing unit (GPU) 922 and various modules. In particular, client 910 includes a network receiver module 912, a projection module 914, an offset vector module 916, an adjustment module 918, a controller module 920, a rendering module 924, a blending module 926, a movement module 928, and a speed adjustment module 930. The various modules may, for example, be specified in client side script files, such as a JavaScript or HTML5 file, that are received from a web server. Each are described in turn.

Network receiver module 912 receives data from server 902 via network 904. In an embodiment, network receiver module 912 receives a speed value corresponding to a speed of a camera when a first image was captured. As described above, the camera may be in motion when the first image was captured. Network receiver module 912 also receives a plurality of time offset values. Each time offset value corresponds to a pixel in images captured by the first camera including the first image and represents a relative time when the camera captured the pixel. The plurality of time offset values may be included in a mask image, such that each pixel of the mask image has a corresponding pixel in the image. The camera captures different portions of the first image at different times. In cases where multiple images are received and processed, network receiver module 912 may receive a speed value for each of the image.

For respective pixels of each image, projection module 914 may extend a ray from a geocode of the first image. The ray is extended based on a location of the pixel and according to the perspective of the camera when it took the image. The perspective may be represented by camera parameters representing an orientation and focal length of the camera when it took the first image. With the ray extended, projection module 914 determines a position in three-dimensional space at an intersection between the ray and the three-dimensional model. That position may be determined using a stitched depth map as described above.

As mentioned above, the intersection determined by the projection module may be inaccurate because of inaccuracies between the geocode of the image and the position of the camera when the pixel was captured. Offset vector module 916 and adjustment module 918 serve to correct these inaccuracies.

For the respective pixels of each image, offset vector module 916 may determine an offset vector. The offset vector may correspond to the speed value of the image and the time offset value corresponding to the pixel. In one embodiment, the magnitude of the offset vector may be the product of the speed value and the time offset value. The direction of the offset vector may be the vehicle's direction of movement. In an embodiment, the vehicle's direction of movement may be approximated as merely being straight ahead. Alternatively, even if the vehicle is turning, the direction of the turn may not vary greatly over the course of the exposure of the entire image. For that reason, the direction of movement may be a constant value associated with the image, similar to the speed value. In this way, offset vector module 916 may determine an offset vector for each pixel of an image. Given that the direction of the vectors may be constant between pixels of an image, the offset vectors may be represented, at least in part, as a mask image, where each pixel of the mask image includes the magnitude of the offset vector corresponding to the pixel.

With the offset values determined, adjustment module 918 alters the position of each point determined by the projection module 914 as specified by the corresponding offset vector. In this way, the adjustment module corrects for a variation between the geocode of the image and a position of the camera when the camera captured the pixel.

In an embodiment, the client device includes a graphics processing unit 922, and the client side scripting code is programmed to integrate with features of the graphics processing unit. For example, in an embodiment, adjustment module 918 uses the altered mask image representing the offset vectors in a call to implement a vertex shader on the graphic processing unit. This technique may utilize faster processing available on the graphics processing unit than would be available if a central processing unit was used exclusively.

Controller module 920 sends signals to the projection module 914, the offset vector module 916, and the adjustment module 918 to repeatedly determine a position in three-dimensional space, determine an offset vector for the position, and alter the position for each pixel in each image. In this way, controller module 920 works with other modules to create a corrected, texture mapped three-dimensional model. Controller module 920 may also control movement between two images. In that embodiment, controller module 920 may with other modules to create two corrected, texture mapped three-dimensional models-one for each image.

Rendering module 924 renders the corrected texture-mapped models from a viewpoint located in three-dimensional space at a position different from the geocodes of the first and second images. To move between images, rendering module 924 renders the corrected texture-mapped models from each viewpoint between the position of the first image and the position of the second image.

Once the two rendered images are determined for a viewpoint, the blending module 926 blends the rendered images to determine an image to be displayed to a user.

Movement module 928 smoothly changes the viewpoint from being located at the geocode of the first image to being located at a position at the geocode of the second image. In this way, movement module 928 adjusts the viewpoint used by the rendering module to create a sense of movement.

While the viewpoint is being changed by the movement module 928, speed adjustment module 930 smoothly increases the first and second speed values from zero when the viewpoint is located at the geocode of the first image to values representing the speeds of the camera when it took the first and second images respectively. After the first and second speed values have reached the values representing the speeds of the camera when it took the first and second images respectively, speed adjustment module 930 smoothly decreases the first and second speed values to reach zero when the viewpoint is located at the geocode of the second image. In this way, by smoothly changing the speed values used in the offset determination, speed adjustment module 930 presents an abrupt shift to a user.

Each of client 910 and server 902 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of server network receiver module 912, projection module 914, offset vector module 916, adjustment module 918, controller module 920, rendering module 924, blending module 926, movement module 928, and speed adjustment module 930 may be implemented in hardware, software, firmware, or any combination thereof.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for correcting projection errors when projecting images, the method comprising:
    determining, by one or more processors, an image mask for an image, wherein the image mask describes relative exposure times of different pixels of the image and corresponding time offset values, where each time offset value corresponds to when a rolling shutter camera captured a different pixel in the image;
    receiving, by the one or more processors, a speed value corresponding to a speed at which the camera was moving when the image was captured and position information identifying a single geocode for the image;
    projecting, by the one or more processors, a pixel of the image into a three-dimensional model using the position information; determining, by the one or more processors, an offset vector based on the speed value and the time offset value for the pixel in the image mask;
    adjusting, by the one or more processors, the projection of the pixel based on the offset value in order to correct a projection error arising from variation between the position information and a position of the camera when the pixel was captured by the camera;
    rendering a first corrected texture-mapped model for the image from a viewpoint in three-dimensional space different from the single geocode of the position information using the adjust projection of the pixel;
    rendering a second corrected texture-mapped model for a second image from the viewpoint; and
    blending the first and second corrected texture-mapped models in order to generate an animated transition between the image and the second image.

2. The method of claim 1, wherein projecting the pixel includes constructing a ray through the pixel according to a focal length of the camera when the image was captured by the camera and a depth value of a three-dimensional image corresponding to the pixel.

3. The method of claim 2, wherein projecting the pixel provides a point value corresponding to a point along the ray at the depth value, and adjusting the projection includes changing the point value.

4. The method of claim 1, further comprising using the adjusted projection of the pixel to blend the image with a second image in order to generate an animated transition between the image and the second image.

5. The method of claim 4, wherein the second image is associated with a second speed value corresponding to a speed at which the camera was moving when the second image was captured, wherein the second speed value is different from the speed value and the method includes using the second speed value to generate the animated transition.

6. The method of claim 1, wherein rendering the second corrected texture-mapped model includes using an adjusted projection of a second pixel of a second image.

7. A system for correcting projection errors when projecting images, the system comprising one or more computing devices having one or more processors configured to:
    determine an image mask for an image, wherein the image mask describes relative exposure times of different pixels of the image and corresponding time offset values, where each time offset value corresponds to when a rolling shutter camera captured a different pixel in the image;
    receive a speed value corresponding to a speed at which the camera was moving when the image was captured and position information identifying a single geocode for the image;
    project a pixel of the image into a three-dimensional model using the position information;
    determine an offset vector based on the speed value and the time offset value for the pixel in the image mask;
    adjust the projection of the pixel based on the offset value in order to correct a projection error arising from variation between the position information and a position of the camera when the pixel was captured by the camera;

render a first corrected texture-mapped model for the image from a viewpoint in three-dimensional space different from the single geocode of the position information using the adjusted projection of the pixel;

render a second corrected texture-mapped model for a second image from the viewpoint; and blend the first and second corrected texture-mapped models in order to generate an animated transition between the image and the second image.

8. The system of claim 7, wherein the one or more processors are configured to project the pixel by constructing a ray through the pixel according to a focal length of the camera when the image was captured by the camera and a depth value of a three-dimensional image corresponding to the pixel.

9. The system of claim 8, wherein projecting the pixel provides a point value corresponding to a point along the ray at the depth value, and wherein the one or more processors are configured to adjust the projection by changing the point value.

10. The system of claim 7, wherein the one or more processors are configured to use the adjusted projection of the pixel to blend the image with a second image in order to generate an animated transition between the image and the second image.

11. The system of claim 10, wherein the second image is associated with a second speed value corresponding to a speed at which the camera was moving when the second image was captured, wherein the second speed value is different from the speed value and the one or more processors are configured to use the second speed value to generate the animated transition.

12. The system of claim 7, wherein the one or more processors are configured to render the second corrected texture-mapped model using an adjusted projection of a second pixel of the second image.

13. A non-transitory, tangible computer-readable medium on which instructions are stored, the instructions when executed by one or more processors cause the one or more processors to perform a method for correcting projection errors when projecting images, the method comprising:

determining an image mask for an image, wherein the image mask describes relative exposure times of different pixels of the image and corresponding time offset values, where each time offset value corresponds to when a rolling shutter camera captured a different pixel in the image;

receiving a speed value corresponding to a speed at which the camera was moving when the image was captured and position information identifying a single geocode for the image;

projecting a pixel of the image into a three-dimensional model using the position information;

determining an offset vector based on the speed value and the time offset value for the pixel in the image mask;

adjusting the projection of the pixel based on the offset value in order to correct a projection error arising from variation between the position information and a position of the camera when the pixel was captured by the camera;

rendering a first corrected texture-mapped model for the image from a viewpoint in three-dimensional space different from the single geocode of the position information using the adjusted projection of the pixel;

rendering a second corrected texture-mapped model for a second image from the viewpoint; and blending the first and second corrected texture-mapped models in order to generate an animated transition between the image and the second image.

14. The medium of claim 13, wherein projecting the pixel includes constructing a ray through the pixel according to a focal length of the camera when the image was captured by the camera and a depth value of a three-dimensional image corresponding to the pixel.

15. The medium of claim 14, wherein projecting the pixel provides a point value corresponding to a point along the ray at the depth value, and adjusting the projection includes changing the point value.

16. The medium of claim 13, wherein the method further comprises using the adjusted projection of the pixel to blend the image with a second image in order to generate an animated transition between the image and the second image.

17. The medium of claim 16, wherein the second image is associated with a second speed value corresponding to a speed at which the camera was moving when the second image was captured, wherein the second speed value is different from the speed value and the method further includes using the second speed value to generate the animated transition.

* * * * *